United States Patent [19]

Pano

[11] Patent Number: 4,887,945
[45] Date of Patent: Dec. 19, 1989

[54] METAL CUTTING TOOL WITH RESILIENT INSERT CLAMP

[75] Inventor: Joseph Pano, Shave Zion, Israel

[73] Assignee: ISCAR Ltd., Nahariya, Israel

[21] Appl. No.: 300,069

[22] Filed: Jan. 19, 1989

Related U.S. Application Data

[63] Continuation-in-part of Ser. No. 94,691, Sep. 9, 1987, abandoned.

[30] Foreign Application Priority Data

Sep. 10, 1986 [DE] Fed. Rep. of Germany ....... 3630752
Oct. 16, 1986 [DE] Fed. Rep. of Germany ....... 3635193

[51] Int. Cl.[4] .................... B23B 29/04; B23B 29/14
[52] U.S. Cl. ................................ 407/110; 407/108; 407/50
[58] Field of Search .............. 82/158; 407/50, 106, 407/107, 108, 109, 110, 111, 112

[56] References Cited

U.S. PATENT DOCUMENTS

| 534,220 | 2/1895 | Kent | 407/50 |
|---|---|---|---|
| 1,391,097 | 9/1921 | Cowles | 407/109 |
| 4,357,123 | 11/1982 | Zweekly | 407/110 |
| 4,580,930 | 4/1986 | Zinner | 407/110 |
| 4,697,963 | 10/1987 | Luck | 407/105 |

FOREIGN PATENT DOCUMENTS

| 2755003 | 6/1978 | Fed. Rep. of Germany | 407/109 |
|---|---|---|---|
| 3301919 | 7/1984 | Fed. Rep. of Germany | 407/110 |

*Primary Examiner*—Robert P. Olszewski
*Assistant Examiner*—William E. Terrell
*Attorney, Agent, or Firm*—Ladas & Parry

[57] ABSTRACT

A tool holder includes an insert receiving pocket formed by a pair of clamping jaws. The upper jaw is resiliently pivoted about a bridge portion by a clamping device. The clamping device includes a screw which wedges a clamping element having a tapered tooth into a slot which urges the upper jaw towards the lower jaw to clamp the insert.

6 Claims, 2 Drawing Sheets

METAL CUTTING TOOL WITH RESILIENT INSERT CLAMP

This application is a continuation-in-part application of copending Application Ser. No. 07/094,691 filed on the 9th Sept., 1987 now abandoned.

FIELD OF THE INVENTION

This invention relates to a metal cutting tool and is in particular concerned with a cutting insert clamping arrangement for use in such a metal cutting tool.

BACKGROUND OF THE INVENTION

Metal cutting tools of the kind to which the present invention relates and which are designed for use in cutting, parting, grooving, turning, and facing operations and the like, generally consist of holder blades of relatively narrow transverse dimensions having formed at one end thereof an open-ended insert pocket within which replaceable cutting inserts are located and retained, they themselves being in their turn held in appropriate tool blocks designed to be secured to the machine tools. The effective retention of the inserts in the insert pockets in such a manner than they are securely held during cutting but can nevertheless be readily released when replacement is called for, has exercised the minds of the designers of such cutting tools for some considerable time.

Thus, in accordance with one type of solution proposed and used to this end, the insert is clamped in position within the insert pocket by the spring biasing force exerted thereon by a resiliently distorted portion of the holder blade itself.

In accordance with another set of proposals directed to the problem of the effective retention of the insert within the insert pocket, the holder blade is provided with separate and manually actuatable mechanical means for mechanically clamping the insert within the insert pocket.

In accordance with one particular proposal falling into this second category (U.S. Pat. No. 4,357,123—Z-weekly) the holder blade is formed with an elongated slot which extends from a longitudinal edge of the blade to a region an inner end of the insert pocket, the slot being formed with a central widened portion designed to receive a camming member which, upon rotation, causes an inwardly directed displacement of the opposite faces of the insert pocket, the effective clamping within the insert pocket of a cutting insert located therein.

The use of such rotatable camming elements so as to secure the clamping displacement of the bounding surfaces of the insert pocket has been previously proposed, for example in DE 3301919 (Keller); DOS 2742423 (Heinlein) and DOS 226472 (Ugine-Carbone). It will be appreciated, however, that the rotation of such a camming element gives rise to forces which are not necessarily limited in their direction to that of the displacement of the bounding surfaces of the insert pocket. Thus, the effort exerted in rotating the camming element is not always most efficiently utilized for achieving the desired displacement of these bounding surfaces.

BRIEF SUMMARY OF THE INVENTION

It is an object of this invention to provide, for use in a metal cutting tool, a cutting insert clamping arrangement wherein clamping is effected in a simple and efficient manner.

According to the present invention there is provided, for use a metal cutting tool, a cutting insert clamping arrangement comprising: a holder blade having a pair of elongated, longitudinally directed edges and a transversely directed leading edge; a pair of clamping jaws formed integrally with the holder blade and being formed with a pair of spaced apart, substantially parallel, clamping surfaces defining between them an insert receiving pocket having a leading end thereof opening into said leading edge; a holder blade portion located rearwardly of said pocket and having formed therein an elongated slot extending from one of said longitudinally directed edges to an inner end thereof located adjacent to and spaced from a rear closed end of said pocket and directed away from said leading edge; an intermediate widened portion of said elongated slot adapted to receive a tightening screw; a bridge portion of said holder blade serving to bridge the inner end of said elongated slot and the rear end of said pocket and about which one of said jaws may be pivotally and resiliently displaced with respect to the other jaw; a clamping element adapted to bear against the holder blade around the widened portion thereof and having at least one tapered tooth projecting therefrom into the elongated slot adjacent the widened portion; and coupling means for coupling said clamping element to said tightening screw whereby said clamping element can be forced against the holder blade and the tapered tooth forced into said slot so as to effect said pivotal displacement of said one jaw, thereby effectively clamping a said cutting insert in said pocket.

Thus, with the cutting insert clamping arrangement in accordance with the invention, clamping of the insert is effected by the linear displacement of the tapered tooth into the slot, thereby forcing apart the bounding edges of the slot in a predetermined direction which is suitably the direction of pivotal displacement of said one jaw. In this way, it is ensured that clamping is readily and simply effected in a most efficient manner.

BRIEF SUMMARY OF THE DRAWINGS

For a better understanding of the present invention, and to show how the same may be carried out in practice, reference will now be made to the accompanying drawings, in which.

DETAILED DESCRIPTION OF PREFERRED EMBODIMENT

Figure 1:
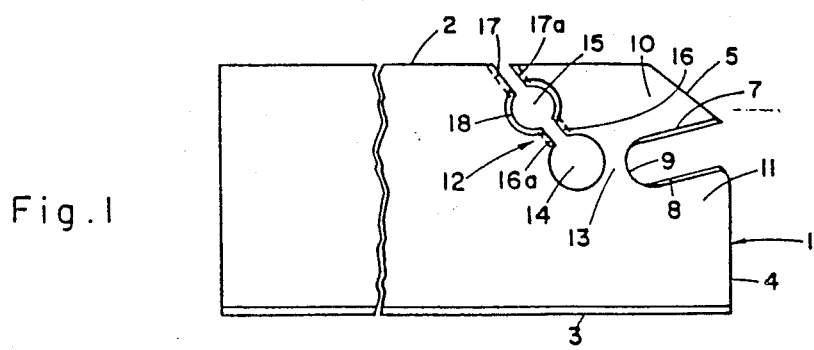
FIG. 1 is a side elevation of a holder blade constituting part of the cutting insert clamping arrangement in accordance with the present invention.
Figure 2:
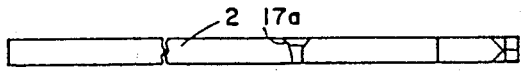
FIG. 2 is a plan view from above of the holder blade shown in FIG. 1.

As seen in FIG. 1 of the drawings, a holder blade 1 of substantially rectangular shape and being of relatively narrow transverse width is formed with a pair of elongated longitudinally directed edges 2 and 3 and a transversely directed leading edge 4 having a rearwardly sloping relieved portion 5. Formed in a leading portion of the holder blade 1 is an open ended insert receiving pocket 6 defined between upper and lower substantially parallel clamping surfaces 7 and 8 and a curved rear end surface 9. As can be seen, the parallel clamping surfaces 7 and 8 of the pocket 6 form an acute angle with the leading edge 4 of the holder blade 1. The clamping surfaces 7 and 8 are of convex V-shaped cross-section so as to facilitate their mating with corresponding concave V-shaped cross-sectional surfaces of an insert to be described below.

The leading portion of the holder blade 1 and on either side of the pocket 6 is a pair of clamping jaws 10 and 11 respectively provided with the clamping surfaces 7 and 8.

An elongated slot 12 is formed in the leading portion of the holder blade 1 and extends from an outer end thereof which opens into the longitudinal edge 2 of the holder blade 1 to an inner end thereof located adjacent to and spaced from the rear curved end of the pocket 6 by a bridge portion 13. The elongated slot 12 slopes away from the leading edge 4 of the holder blade 1 in a direction which forms an acute angle of about 45° with the longitudinal axis of the holder blade 1.

The elongated slot 12 is formed, at its inner end (adjacent the bridge portion 13), with a circular, widened portion 14 and, at an intermediate portion thereof, with a circular, widened portion 15. The widened portion 15 has, formed at diametrically opposed portions thereof, elongated slot sections 16 and 17, the section 16 serving to separate the two widened portions 14 and 15, whilst the section 17 opens into the longitudinal edge 2 of the holder blade 1. As seen in FIG. 1 of the drawings, a rim 18 of the widened portion 15 is taperingly countersunk (for a purpose to be described below). Similarly, the bounding edges 16a and 17a of the slot sections 16 and 17 are chamfered (for a purpose to be described below).

Figure 3:
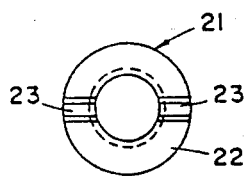
FIG. 3 is a plan view from above of a clamping element forming part of the cutting insert clamping arrangement in accordance with the invention.
Figure 4:
FIGS. 4 and 5 are, respectively, differing side elevations of the clamping element shown in FIG. 3.
Figure 5:
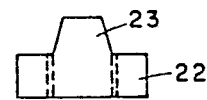

As seen in FIGS. 3, 4 and 5 of the drawings, a clamping element 21 comprises an internally threaded ring portion 22 formed integrally with a pair of diametrically opposed tapered teeth 23. The angle of taper of the teeth 23 corresponds to the angle of chamfering of the bounding edges 16a and 17a of the slot sections 16 and 17, the top width of the teeth 23 being slightly less than the spacing apart of the edges 16a and 17a so as to facilitate the entry of the teeth into the slot.

Figure 6:
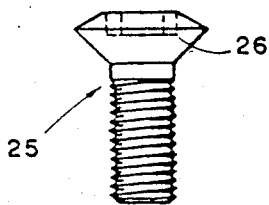
FIG. 6 is a side elevation of a tightening screw forming part of the cutting insert clamping arrangement in accordance with the invention.
Figure 9:
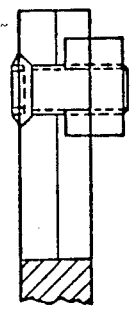
FIG. 9 is a cross-sectional view of part of the clamping arrangement shown in FIG. 8 taken along the line IX—IX.

The clamping arrangement furthermore inlcudes a tightening screw 25 (see FIG. 6 of the drawings) having a tapering head 26 having dimensions and angle of taper corresponding to the countersunk rim 18 of the widened portion 15.

Figure 8:
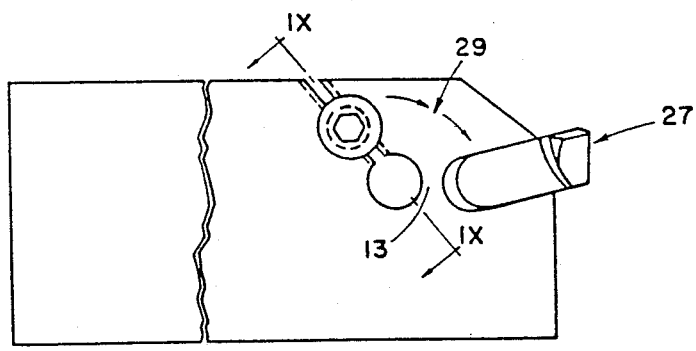
FIG. 8 is a side elevation of the assembled holder blade insert and clamping arrangement.
Figure 7:
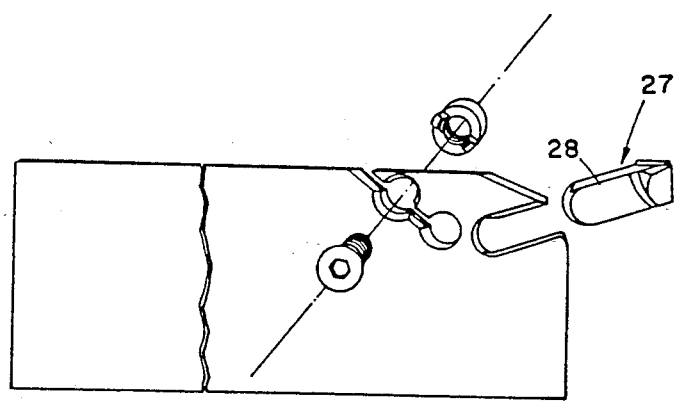
FIG. 7 is an exploded view of the holder blade shown in FIGS. 1 and 2 with the elements shown in FIGS. 3 to 6 and with a cutting insert to be retained.

The use of the clamping mechanism in retainably clamping a cutting insert 27 (see FIGS. 7 and 8 of the drawings) in the holder blade 1 will now be described. The cutting insert 27 is provided with upper and lower elongated edges 28 and 29 in which are formed elongated concave grooves of substantially V-shaped cross-section. Thus, upon insertion of an insert into the receiving pocket 6 as seen in FIG. 7 of the drawings, the convex clamping surfaces 7 and 8 mate in the corresponding concave edges of the insert, thereby preventing lateral movement of the insert with respect to the holder blade 1. With the insert located in the pocket 6, the clamping element 21 is palced in position with the tapering teeth thereof projecting into the slot sections 16 and 17 so as to contact the chamfered bounding edges 16a and 17a thereof. The tightening screw 25 is now inserted into the widened portion 15 of the elongated slot 12 so that its tapering head is received by the countersunk rim 18 of this widened portion. The screw 25 is now screwed into the clamping element 21 as a result of which the ring portion 22 thereof is pressed against the side of the holder blade 1 surrounding the widened portion 15 and the tapered teeth 23 are forced into the slot sections 16, 17. As a consequence of the tapered nature of the teeth 15 and the chamfered slot sections 16 and 17, the clamping jaw 10 is pivotally and resiliently displaced in a clock-wise sense in the direction of the arrow 29 (FIG. 8). In this way, the insert 27 is effectively clamped. When it is desired to release the insert the screw 25 is merely rotated in an opposite sense.

Figure 10:
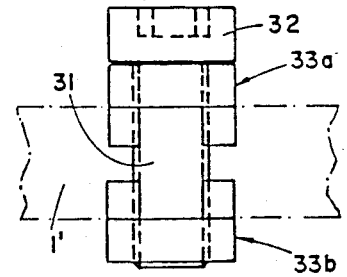
FIG. 10 is a schematic representation of a modified form of clamping arrangement in accordance with the invention.

In an alternative embodiment in accordance with the invention shown schematically in FIG. 10, the clamping screw 25 is replaced by a clamping screw 31 having a substantially cylindrical head 32. The clamping arrangement furthermore comprises a pair of clamping elements 33a and 33b formed substantially identically with the element 21 except that only the internal bore of the element 33b is threaded. This modified clamping arrangement is designed for use with a slightly modified holder blade 1' in which the bounding edges of the slot sections 16 and 17 are chamfered along both faces of the holder blade 1'. With this clamping arrangement and with the clamping elements 33a and 33b located on either side of the widened portion 15 of the holder blade 1' the tapering teeth of both clamping elements 33a and 33b project into the slot sections 16 and 17 whilst the tightening screw 31 passes through the clamping element 33a and is screwed into the clamping element 33b. As a result of the screw tightening of the clamping screw 31, the tapering teeth of both clamping elements 33a and 33b are forced into the slot sections 16 and 17 with the consequent resilient displacement of the clamping jaw 10 in a clockwise sense in the direction of the arrow 29.

Whilst in the clamping arrangement specifically described above the or each clamping element is shown as being provided with a pair of diametrically opposed tapering teeth, it is possible to carry out the invention using a clamping element formed with only one such tooth and the forced introduction of such a single tooth into the slot section can result in the resilient displacement of the clamping jaw 10 into the clamping of the insert.

Furthermore, it is possible to form the clamping element so as to be integral with the head of the tightening screw in that one or two tapering teeth project from this head into the slot sections. In this case, the tightening screw is inserted in the widened portion with the tapering teeth projecting into the slot sections and tightening is effected by the screw rotation of a nut located on the opposite side of the holder blade, into which nut the tightening screw projects.

Furthermore, the clamping element can be constituted, for example by a disc-like washer provided with one or two tapering teeth, the washer being interposed between the head of the tightening screw and the adjacent surface of the holder blade. In this case, the screw rotation of the tightening screw into a locking nut located on the opposite side of the holder blade results in the forced insertion of the tapering teeth into the slot sections and the corresponding resilient displacement of the clamping jaw into clamping of the insert.

What is claimed is:

1. For use in a metal cutting tool, a cutting insert clamping arrangement comprising:
    a holder blade having a pair of elongated, longitudinally directed edges and a transversely directed leading edge;
    a pair of clamping jaws formed integrally with the holder blade and being formed with a pair of spaced apart, substantially parallel, clamping surfaces defining between them an insert receiving pocket having a leading end thereof opening into said leading edge;
    a holder blade portion located rearwardly of said pocket and having formed therein an elongated slot extending from one of said longitudinally directed edges to an inner end thereof located adjacent to and spaced from a rear closed end of said pocket and directed away from said leading edge;
    an intermediate widened portion of said elongated slot adapted to receive a tightening screw;
    a bridge portion of said holder blade serving to bridge the inner end of said elongated slot and the rear end of said pocket and about which one of said jaws may be pivotally and resiliently displaced with respect to the other jaw;
    a clamping element adpated to bear against the holder blade around the widened portion thereof and having at least one tapered tooth projecting therefrom into the elongated slot adjacent the widened portion; and
    coupling means for coupling said clamping element to said tightening screw whereby said clamping element can be forced against the holder blade and the tapered tooth forced into said slot so as to effect said pivotal displacement of said one jaw, thereby effectively clamping a said cutting insert in said pocket.

2. A cutting insert clamping arrangement according to claim 1 wherein said clamping element comprises an internally threaded ring portion with said at least one tapered tooth formed integrally therewith, said tightening screw, extending through said intermediate widened portion is adapted to be screwed into said ring position so as to force said at least one tapered tooth into said slot in wedging contact with chamfered edges thereof.

3. A cutting insert clamping arrangement according to claim 2, wherein said clamping element is formed with two tapering teeth formed integrally with diametrically opposed sections of said ring portion.

4. A cutting insert clamping arrangement according to claim 2, wherein said tightening screw is formed with a tapering head and wherein said intermediate widened portion is formed with a tapering countersunk rim designed to accommodate said tapering head.

5. A cutting insert according to claim 1, wherein a pair of clamping elements are provided, each clamping element having a ring portion with said at least one tapered tooth formed integrally therewith, a first of said ring portions being internally threaded, said clamping elements being located repsectively on opposite sides of said holder blade, said tightening screw extending through a second of said ring portions and said intermediate widened portion so as to be screwed into said first clamping element with a widened head portion thereof bearing against said second clamping element so as to force said at least one tapered tooth of each clamping element into said slot in wedging contact with chamfered edges thereof.

6. A cutting insert clamping arrangement according to claim 5, wherein each clamping element is formed with the tapering teeth formed integrally with diametrically opposed sections of its ring portion.

* * * * *